United States Patent [19]

Levy

[11] Patent Number: 5,163,765
[45] Date of Patent: Nov. 17, 1992

[54] COLLAPSIBLE KEYBOARD

[75] Inventor: David H. Levy, Santa Clara, Calif.

[73] Assignee: Apple Computer, Inc., Cupertino, Calif.

[21] Appl. No.: 846,188

[22] Filed: Mar. 4, 1992

[51] Int. Cl.⁵ .............................. B41J 5/16; B41J 5/12
[52] U.S. Cl. .................................. 400/492; 400/472; 200/5 A; 235/145 R
[58] Field of Search ............... 400/492, 490, 493, 495, 400/472; 200/5 R, 5 A, 515, 514, 513, 512; 235/145 R

[56] References Cited

U.S. PATENT DOCUMENTS

| | | | |
|---|---|---|---|
| 3,699,294 | 10/1972 | Sudduth | 200/5 A |
| 3,940,758 | 2/1976 | Margolin | 200/5 A |
| 4,302,648 | 11/1981 | Sago et al. | 200/515 |
| 4,492,829 | 1/1985 | Rodrique | 200/5 A |
| 4,536,625 | 8/1985 | Bebie | 200/5 A |
| 4,710,597 | 12/1987 | Loheac | 235/145 R |
| 4,800,243 | 1/1989 | Osawa et al. | 200/514 |
| 4,950,874 | 8/1990 | Damitio et al. | 400/472 |
| 4,952,761 | 8/1990 | Viebrantz | 200/513 |
| 5,044,798 | 9/1991 | Roylance et al. | 400/472 |

FOREIGN PATENT DOCUMENTS

| | | | |
|---|---|---|---|
| 2586117 | 2/1987 | France | 235/145 R |
| 8200064 | 1/1982 | PCT Int'l Appl. | 235/145 R |

Primary Examiner—Edgar S. Burr
Assistant Examiner—Anthony Nguyen
Attorney, Agent, or Firm—Jonathan B. Penn

[57] ABSTRACT

A collapsible keyboard for use with portable personal computers is disclosed. A first preferred embodiment of the present invention comprises a keyboard molded from a conductive, elastomeric material and a collapsible frame/circuit board substrate, the substrate having a plurality of electrical contacts to indicate to the computer when a key is pressed. As the keyboard is formed from an elastic material, it can be compressed into a first, closed position of minimum size to facilitate carrying the computer and to minimize the computer's size. In the keyboard's second, expanded position, each of the molded keys overlies a pair of contacts. When a key is pressed while the keyboard is in this second position, an electrical circuit is formed by the key and the contacts, indicating to the computer both that a key has been pressed and which key has been pressed. In another embodiment of the present invention, two pairs of contacts underlie each key, one pair being used when the keyboard is in its first position and the other pair being used when the keyboard is in its second position.

5 Claims, 1 Drawing Sheet

COLLAPSIBLE KEYBOARD

BACKGROUND OF THE INVENTION

This invention is in the field of keyboards. In particular, a first embodiment of the present invention relates to keyboards for portable personal computers.

Alphanumeric keyboards and their use as data input devices to digital computers are known. Although many different types of keyboards are known, including the well-known "QWERTY" keyboard, a standard size keyboard has evolved. The necessity for a standard keyboard size, including a standard size for the individual keys, as well as for the overall size and arrangement of the keys, should be obvious, as it allows an individual to use any keyboard with roughly equal facility.

Although standard size keyboards are adequate for computers used in a single fixed location, they have the obvious drawback of their size when incorporated into the increasingly ubiquitous portable personal computer. In such computers, the electronics which comprise the operative circuitry does not determine the final size of the portable computer. Rather, the input device, such as the keyboard, and the output device, typically a liquid crystal display ("LCD"), dictate the final size.

The keyboard in particular presents a difficult design problem. Obviously, the individual keys used in the typical keyboard for a non-portable computer could be reduced in size. However, the limit beyond which shrinking the individual keys creates increasing user difficulties in operating the keyboard is rapidly reached. Most work on shrinking keyboard size has concentrated on reducing the thickness of the keyboard, not on reducing its length or width.

A keyboard or reduced length and/or width, which nonetheless retains the operating convenience inherent in a standard, full-size keyboard, would permit further reductions in the size of portable computers. To date, no such keyboard is known.

SUMMARY OF THE INVENTION

The present invention, in its first preferred embodiment, comprises a molded plastic keyboard mounted in a length-wise collapsible frame. The key tops are molded of a hard plastic material. The rest of the keys and the keyboard itself are molded from a flexible conductive elastomeric material. This assembly is mounted on a metal or plastic frame that can be collapsed and expanded along its length-wise axis. As the keyboard is formed from a flexible material, it can be "accordioned" to form a very compact and short keyboard assembly when not in use. In the first embodiment, the keyboard contacts would only be operable when the keyboard was in its expanded condition. In a second embodiment, the keyboard could be operated in its first, compressed condition as well as in its expanded condition.

The present invention will now be described in detail with reference to the figures listed and described below.

BRIEF DESCRIPTION OF THE ILLUSTRATIONS

DETAILED DESCRIPTION OF THE PREFERRED EMBODIMENTS

Figure 1:
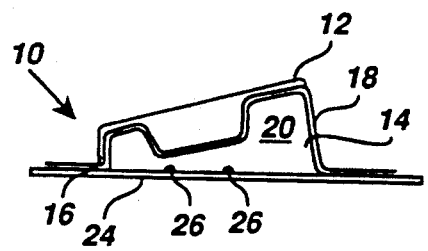
FIG. 1 shows one key of the present invention in an inactive position.

A single key of the keyboard and frame that comprise the first embodiment of the present invention is shown in FIG. 1. Key 10 is comprised of two different plastics. Top surface 12 of key 10 is formed from a hard plastic. Although any type of hard, impact-resistant plastic would be acceptable, one preferred type of plastic is acrylonitrile butadiene styrene ("ABS"). Body 14 of key 10 is formed from a conductive, flexible elastomeric material. Although any one of several types of elastomeric material is acceptable, key body 14 in this embodiment is made from a silicon elastomer doped with a conductor such as carbon or silver. This type of elastomer is known. It should be noted that the entire keyboard, not just key 10, is fabricated at the same time as part of a two-step injection molding process. In this two-step process, key tops 12 would be injected and solidified first, followed by the flexible elastomeric material.

Figure 2:
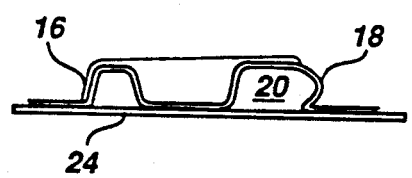
FIG. 2 shows the key of FIG. 1 is an active position.

Key 10 is fashioned so that side 16 of the key is much shorter than the other sides. Side 16 acts as the hinge of the key, so that when key 10 is depressed, it pivots from side 16 downward. When key 10 is pressed into an active position, as shown in FIG. 2, long side 18 of key 10 is compressed, as well as right side 20 and the left side (not shown). This structure also insures that when key 10 is depressed, it will reliably contact the same spot on underlying printed circuit board 24, which has a plurality of key contact points 26, a pair of contacts 26 underlying each key 10. Although there is decoding circuitry which indicates to the computer coupled to the present invention which key has been pressed, that circuitry is known and forms no part of the present invention. Therefore it is not illustrated herein.

Figure 3:
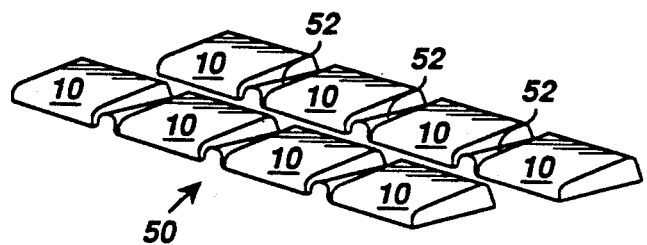
FIG. 3 shows the entire keyboard of the present invention in a compacted position.
Figure 4:
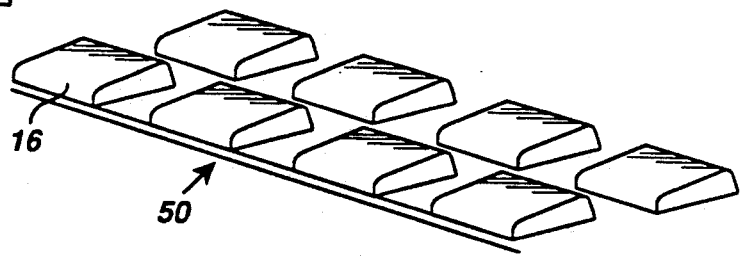
FIG. 4 shows the keyboard of FIG. 3 in an expanded position.

FIG. 3 shows how a group of keys 10 would appear when they form part of a complete keyboard assembly, which is shown in its compressed state in FIG. 3. The elastomeric material which forms the bulk of keyboard 50 is compressed between each key 10, forming a row of accordion pleats 52 between each key 10. In the expanded position of keyboard 50 shown in FIG. 4, these ridges of material lie flat against the printed circuit board which forms the substrate of keyboard 50.

Figure 5:
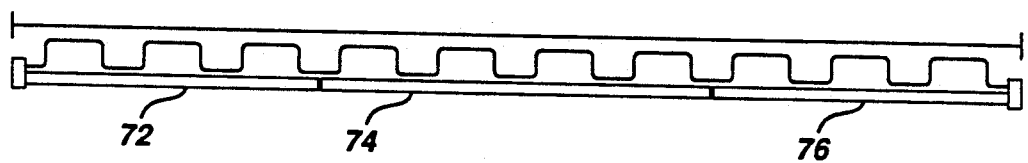
FIG. 5 shows the keyboard and frame of the present invention in an expanded position.
Figure 6:
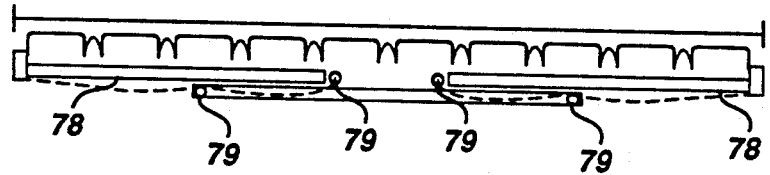
FIG. 6 shows the keyboard and frame of FIG. 5 in a compacted position.

One possible frame arrangement for keyboard 50 is shown in FIGS. 5 and 6. In FIG. 5, keyboard 50 is held in its expanded position by frame 70, which is here comprised of three sliding member 72, 74 and 76. In this expanded position, middle sliding member 74 is locked into place between members 72 and 76, holding the keyboard in its open position. In the closed position illustrated in FIG. 6, pins 79 in members 72 and 76 slide over the top of member 74 along rails 78, allowing the keyboard to be compressed into its closed position. As noted on FIGS. 5 and 6, the keyboard in its collapsed position measures 205 mm and 274 mm in its expanded position. Although one particular frame arrangement is illustrated herein, many two position, mechanically collapsible frames are known and the use of any one of these would be within the scope of the present invention.

Although the embodiment illustrated herein uses only a single pair of contacts beneath each key (see FIG. 1), one variant that would have a great deal of utility uses two pairs of contacts beneath each key, one contact pair being activated when the key is pressed when the keyboard is in its open, expanded position and the other contact pair being activated when the key is pressed when the keyboard is in its closed position. Although normal typing would be very difficult, if not impossible while the keyboard is in its closed position, there would be many situations where only a few keys would need to be struck. Such situations could include opening a file or recalling an address. This two contact pair arrangement would allow for limited key use while the keyboard was in its closed position.

Given the range of possible variations in the present invention, including the use of different types of mechanically expanding and collapsing frames, the different types of elastomeric material that could be used, and the different contact arrangements that could be made to allow the keyboard's use in two or more positions, it is intended that the appended claims be interpreted as including the mentioned variations as well as all other changes and modifications.

What is claimed is:

1. A collapsible keyboard comprising:
   frame means having a closed first position and an open second position, the frame means additionally comprising a first plurality of contact means capable of generating a signal; and
   keyboard means comprising an elastomeric and conductive substrate, the substrate being molded to form a keyboard with a plurality of keys, the top of each of the keys being formed from a hard, impact-resistant plastic, the elastomeric substrate being capable of being collapsed into a first closed position and expanded into a second, open position, the keys overlying the first contact means when in the open position, an electrical circuit being formed when the keys are pressed to contact the contacts, the creation of the electrical circuit indicating to a computer to which the keyboard has been coupled that a key has been depressed.

2. A method for creating a collapsible keyboard comprising the steps of
   molding a plurality of key tops from a hard plastic material;
   molding a plurality of key bodies and material to interconnect the key bodies from a conductive elastic material, the key bodies being molded onto the key tops; and
   mounting the key tops, key bodies and interconnecting material unto a collapsible frame, the frame having at least a first, open position and a second, closed position, the key bodies overlying a first plurality of key contacts when the frame is in the first position.

3. The method of claim 2, wherein the key bodies overlie a second plurality of key contacts when the frame is in the second position.

4. The collapsible keyboard of claim 1 wherein the keys overlie a second plurality of contact means when the frame is in the first, closed position.

5. A collapsible keyboard comprising:
   flexible conductive elastomer keyboard body having a plurality of flexible molded key bodies;
   a plurality of key tops comprised of a hard plastic material mounted on the plurality of key bodies;
   printed circuit means having a plurality of key contact points, the printed circuit means being capable of being collapsed to a first closed position and opened to a second, expanded position;
   frame means having a first closed position and a second, expanded position, the printed circuit means being mounted on the frame means and the keyboard body being mounted on the printed circuit means, the key bodies and attached key tops overlying the key contact points of the printed circuit means when the frame means is in the second position.

* * * * *